United States Patent Office 3,066,221
Patented Nov. 27, 1962

3,066,221
DETECTOR OF FREE WATER IN LIQUIDS OF LOW WATER SOLUBILITY
Per T. Thyrum, Box 346, Milford Road, Berlin, N.J.
No Drawing. Filed July 13, 1961, Ser. No. 123,907
4 Claims. (Cl. 250—71)
(Granted under Title 35, U.S. Code (1952), sec. 266)

The invention described herein may be manufactured and used by or for the Government of the United States of America for governmental purposes without the payment of any royalties thereon or therefor.

This invention relates to a method of determining the presence of free water in liquids of low water solubilities. More specifically, the invention relates to the determination of small quantities of undissolved water present in aircraft fuels.

The problem of finding a way to detect the presence of free water in gasoline, kerosene and other such hydrocarbons has become critical in the last few years because of the numerous difficulties caused when such water freezes thereby blocking the fine screens, filters and other small and critical openings located in many parts of the aircraft fuel system. Since water freezing temperatures consistently occur in high flying aircraft, this water freezing hazard is real.

All hydrocarbons dissolve very small amounts of water. This water is completely combined with the fuel and will not separate during ordinary handling in a system completely filled with fuel. The maximum amount of water which can be dissolved in a fuel at a particular temperature is termed the "saturation" value. Since the saturation value changes with temperature and the molecular structure of the hydrocarbons, saturated compounds such as parafins dissolve the least water while unsaturated compounds such as aromatics dissolve the most, the concentration of free water is constantly changing.

As soon as water is put into fuel in excess of the fuel's saturation value, the water becomes free water. If enough is present, it will settle; however, the rate of settling depends upon water particle size, fuel cleanliness and inhibitor content.

Under the prior art there were many methods available for the determination of small amounts of total water found in liquids. These methods involve infra red spectrophotometry, conductivity devices, and chemical methods. All of these methods require expensive equipment and the services of a skilled analyst. Moreover, they give readings which indicate the total content of water found in a fuel sample and not the free water present.

An object of this invention is to provide a method which is able to quickly indicate the presence of free water in a fuel without first having to determine the saturation value for such fuel.

Another object of the invention is to provide a method which is able to determine the presence of free water as it flows through a fuel line thereby monitoring the entire flow of the line without having to make any corrections for temperature.

A further object of the invention is to provide a method which is inexpensive and simple to operate and which can be operated in the field by unskilled technicians thereby not requiring fuel samples to be brought to a laboratory.

Other objects and many of the attendant advantages of this invention will be readily appreciated as the same becomes better understood by reference to the following detailed description.

According to my invention, a saturated solution of potassium fluorescein is placed on one side of a filtering element so as to form a thin uniform film thereon. A test sample is passed through the filtering element at a prescribed flow rate. If any free water is present, it will cause a yellow-green stain on the treated side of the filtering element. This stain is clearly visible under ultraviolet light so that free water in concentration as low as 5 parts per million may be easily detected.

The fluorescein solution is prepared in the following manner:

A solution of anhydrous methanol is saturated with potassium hydroxide pellets and allowed to stand 5 or 6 hours (preferably overnight) to allow the potassium hydroxide flakes to settle out of solution. The clear solution is then decanted into another container and saturated with fluorescein. This solution is allowed to settle out and the clear potassium fluorescein alcohol solution is ready for use.

My filtering element consists of a white cellulosic material, such as, white unsized paper, paper pulp, woven cotton cloth and the like. I prefer to use circular white unsized paper, having a thickness 0.03 inch and a diameter of from 0.25 inch to 1.85 inches. One side of the paper is treated with the methanol solution saturated with the potassium salt of fluorescein. The solution may be sprayed, brushed or the like so that it forms a thin stain of approximately 0.007 inch of potassium fluorescein dispersed uniformly over one side of paper. After drying in air, the filtering element is ready for use to test the free water content of a liquid such as a jet fuel. To prevent contamination by exceedingly moist air, it is stored in a desiccator.

In testing for free water, the filtering element or pad is suitably mounted in a holder having a suction connected thereto. The test samples of liquid are drawn through the filter pad. It is important to keep the flow rate constant in order to obtain accurate results. The limitations on the flow rate are from 35 ml. per minute up to as high as 2200 ml. per minute.

In my preferred method, I place the sample of jet fuel inside of a polyethylene bottle. I then squeeze the bottle to cause the test fuel to flow from the bottle through the filter pad. This rate is approximately 35 ml. per minute. After filtration, the filter pad is removed and inspected under an ultraviolet light for fluorescence. Any trace of free water in the fuel will cause a yellow-green fluorescence. Samples containing less than the saturating amount of water do not give any fluorescing indication. When 150 ml. samples of navy grade jet B-4 jet fuel were tested at a flow rate of 35 ml. per minute, as little as 5 parts per million of water above the saturating amount was detected.

If more accurate determinations of free water are desired, a standardized curve may be made of known water content above the saturation limit of a specific sample at a specific temperature. The concentration of the water added in parts per million is plotted against the intensity of the fluorescence of the potassium fluorescein. The sample containing the unknown quantity of free water can then be calculated by comparing its intensity of emission with that of the standard curve.

This method is designed as a means for the detection of trace amounts of free or dispersed water in jet fuels. It is to be utilized as a qualitative field test to detect the presence of free or dispersed water in jet fuels at concentrations below 15 parts per million. The method is rapid, inexpensive and simple enough to be operated by untrained personnel. It is not sensitive to dissolved water and will work in any type of jet fuel or kerosene regardless of the crude source and is not affected by the presence of any of the crude jet fuel additives found therein.

It is thus apparent that my method for indicating the presence of free water has many advantages over those known in the prior art.

It would be understood that various changes in the details, materials and arrangements of steps which have been herein described and illustrated in order to explain the nature of the invention, may be made by those skilled in the art within the principle and scope of the invention as expressed in the appended claims.

I claim:

1. The method of determining the presence of water above saturation value in a liquid of low water solubility which comprises treating one side of an element with a methanol solution saturated with the potassium salt of fluorescein, said element consisting of white circular unsized cellulosic material, passing the liquid through the said element and observing under ultraviolet light the color of the treated element, whereby the presence of the water is indicated by a yellow-green fluorescence on the treated side of the said element.

2. The method of determining the presence of water above the saturation value in a jet fuel of low water solubility which comprises brushing a methanol solution saturated with the potassium salt of fluorescein uniformly over one side of a white unsized paper to a depth of 0.007 inch; filtering the jet fuel through the paper at a rate of 35 ml. per minute and observing under ultraviolet light the color of the treated side of the paper whereby the presence of water is indicated by a yellow-green fluorescence in the potassium fluorescein.

3. The method of determining the presence of water above the saturation value in a jet fuel of low water solubility which comprises spraying a methanol solution saturated with the potassium salt of fluorescein uniformly over one side of a white unsized paper to a depth of 0.007 inch; filtering the jet fuel through the paper at a rate of 35 ml. per minute and observing under ultraviolet light the color of the treated side of the paper whereby the presence of water is indicated by a yellow-green fluorescence in the potassium fluorescein.

4. The method of determining the concentration of water above the saturation value in a jet fuel of low water solubility which comprises spraying a methanol solution saturated with the potassium salt of fluorescein uniformly over one side of a white unsized paper to a depth of 0.007 inch; filtering the jet fuel through the paper at a rate of 35 ml. per minute; observing under ultraviolet light the color of the said fluorescein; whereby the concentration of water above the saturation value can be determined by comparing the intensity of the light emission of the yellow-green fluorescence of the fluorescein with the intensities of the fluorescein treated with samples of jet fuel having known water content above the saturation value therein.

References Cited in the file of this patent

UNITED STATES PATENTS

| | | |
|---|---|---|
| Re. 22,081 | Campbell | Apr. 28, 1942 |
| 2,451,885 | Stephens | Oct. 19, 1948 |
| 2,591,737 | Souther | Apr. 8, 1952 |
| 2,632,114 | Silvertooth | Mar. 17, 1953 |
| 2,926,260 | Selle | Feb. 23, 1960 |